United States Patent [19]

Nelson et al.

[11] 4,306,110

[45] Dec. 15, 1981

[54] APPARATUS FOR DETERMINING PLANAR COORDINATES

[75] Inventors: Roger E. Nelson, Northridge; William E. Ward, Canoga Park, both of Calif.

[73] Assignee: The Sierracin Corporation, Sylmar, Calif.

[21] Appl. No.: 128,033

[22] Filed: Mar. 7, 1980

[51] Int. Cl.³ ............................................. G08C 21/00
[52] U.S. Cl. ................................................... 178/18
[58] Field of Search ........................... 178/18, 19, 20; 340/347 AD, 870.38, 146.3 SY; 33/1 M; 35/9 C

[56] References Cited

U.S. PATENT DOCUMENTS

| | | | |
|---|---|---|---|
| 3,005,050 | 10/1961 | Koenig, Jr. ............................ | 178/20 |
| 3,632,874 | 1/1972 | Malavard et al. ..................... | 178/18 |
| 3,662,105 | 5/1972 | Hurst et al. ............................ | 178/18 |
| 3,875,331 | 4/1975 | Hasenbalg ............................. | 178/18 |
| 3,885,097 | 5/1975 | Pobgee ................................... | 178/18 |
| 3,959,585 | 5/1976 | Mattes et al. .......................... | 178/18 |
| 4,079,194 | 3/1978 | Kley ....................................... | 178/18 |
| 4,125,743 | 11/1978 | O'Boyle et al. ....................... | 178/18 |

*Primary Examiner*—Thomas A. Robinson
*Attorney, Agent, or Firm*—Christie, Parker & Hale

[57] ABSTRACT

A pair of overlapping, normally spaced conductive sheets (16,18) have sufficient flexibility between them to permit electrical contact when touched. One sheet has spaced, approximately parallel electrodes (20,21). The other sheet has spaced approximately parallel electrodes (22,23) transverse to the electrodes of the one sheet. A source of electrical power (10,12) is alternatively connected across the electrodes of one sheet to the exclusion of the other sheet. One electrode of each sheet is coupled to a signal processing circuit (32) having a high impedance differential input.

12 Claims, 3 Drawing Figures

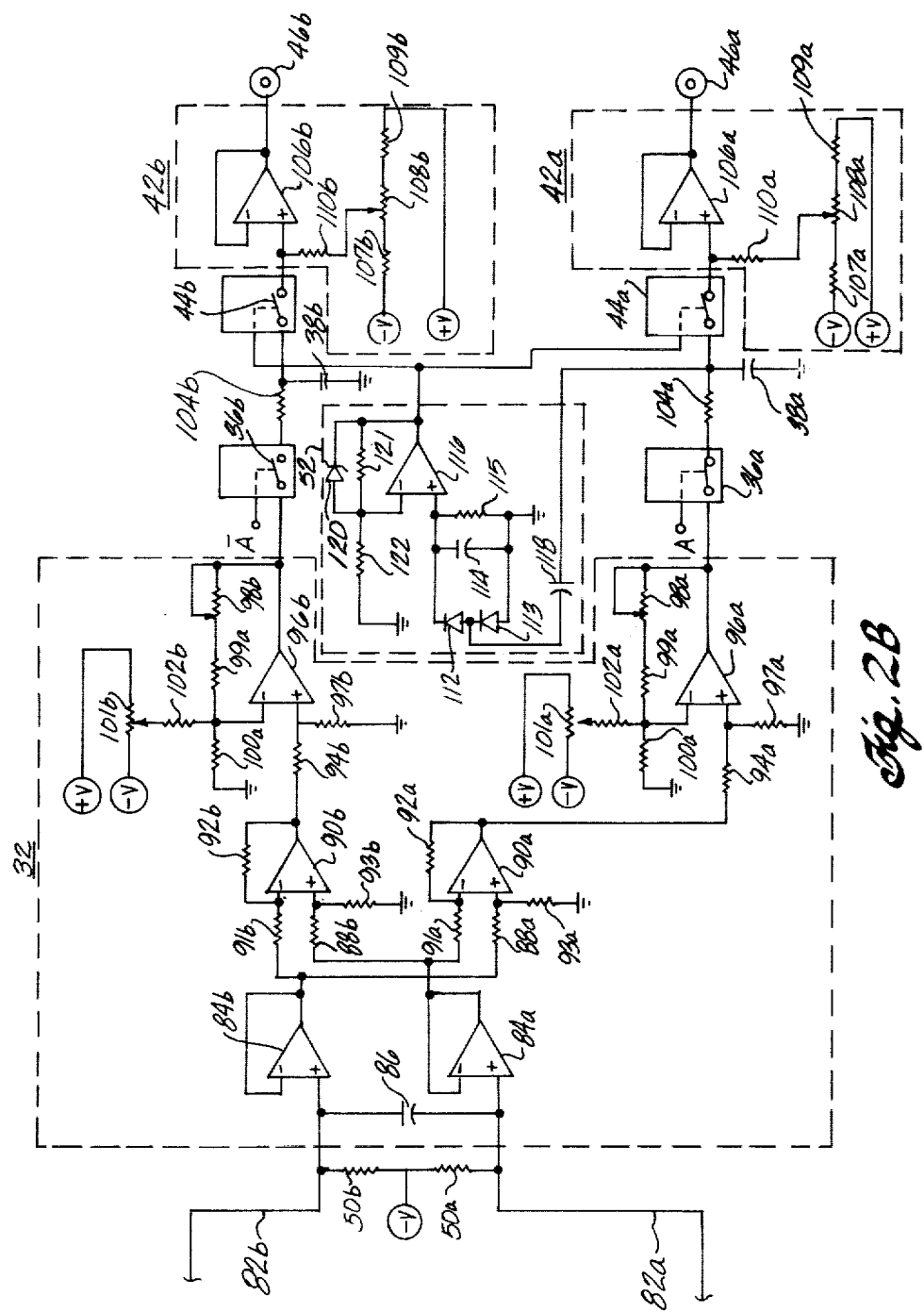

APPARATUS FOR DETERMINING PLANAR COORDINATES

BACKGROUND OF THE INVENTION

This invention relates to the visual display art, and more particularly, to apparatus for determining the planar coordinates of designated points on a writing surface.

Among other uses, apparatus for determining planar coordinates can serve as the transmitter in a teleautograph system as illustrated in Koenig U.S. Pat. No. 3,005,050, or as an input device to a CRT display and/or a digital computer as illustrated in Malavard U.S. Pat. No. 3,632,874. Various forms of energy including light, sound, and electricity have been utilized in the past to sense designated points in such apparatus. Probably the most common form of energy used in such apparatus is electricity. Overlapping, electrically conductive sheets are biased in various ways by electrical power sources to generate signals representative of the coordinates of designated points with respect to the surface of the sheets. Usually, a point is designated by making electrical contact between sheets when they are touched, by virtue of their flexibility. To generate analog signals, most apparatus employs a grounded pointer or stylus, which impedes free movement of the pointer due to the necessary grounding wire.

The previously referenced Koenig patent energizes crossed conductive sheets through a bridge circuit in such a manner that a free stylus can be utilized to generate analog, coordinate representative signals. Koenig teaches that a signal indicating when the stylus is not touching the sheets appears between two specific points in his bridge circuit. As pointed out by Koenig, the signals generated by his apparatus are nonlinear in that each signal is to some extent representative of both coordinates of the points designated by the stylus. In a teleautograph system, such nonlinearity is of no consequence if the same type of apparatus is used at the transmitter and the receiver, because the receiver compensates for the nonlinearity of the transmitter. The use of apparatus for determining planar coordinates as an input device to a CRT display and/or a digital computer, however, does not afford such a convenient means for compensating for Koenig's nonlinearity.

Mattes et al U.S. Pat. No. 3,959,585 discloses apparatus in which electrical power is supplied to a pair of overlapping conductive sheets on an alternating basis. Specifically, the conductive sheets are normally insulated, but permit intermittent electrical contact between the sheets at selected points thereof. First and second indications are continuously generated on an alternate basis. Responsive to the first indication, an electrical potential gradient is impressed across one sheet in a first direction by a switch, while maintaining equipotential lines perpendicular to the first direction and floating the potential of the other sheet and the potential of the other sheet is transmitted by a switch to a single ended amplifier, thereby generating a signal representative of the coordinate of the point of contact parallel to the first direction. Responsive to the second indication, the roles of the conductive sheets are reversed; a potential gradient is impresssed across the other sheet in a second direction by a switch perpendicular to the first direction and the potential of the one sheet is transmitted by a switch to the amplifier thereby generating a signal representative of the coordinate of the point of contact parallel to the second direction. Thus, the roles of the sheets switch each time the indication changes. For a short duration during each cycle, the input to the amplifier is connected to a reference potential to eliminate a capacitive affect while the sheets are not contacting each other.

SUMMARY OF THE INVENTION

One feature of the invention is a signal processing circuit having a high input impedance and first and second differential input terminals. A pair of normally spaced overlapping conductive sheets have sufficient flexibiltiy between them to permit electrical contact when touched. First and second spaced approximately parallel electrodes extend across one sheet. First and second spaced approximately parallel electrodes extend across the other sheet transversely to the first and second electrodes extending across the one sheet. A source of electrical power is alternatively connected across the first and second electrodes of one sheet to the exclusion of the first and second electrodes of the other sheet. The second electrodes of the sheets are connected to the respective input terminals of the differential signal processing circuit to alternatively indicate across such input terminals the planar coordinates of a point of electrical contact between the sheets. The signal processing circuit provides a continuous signal representative of each coordinate of the point of electrical contact.

Another feature of the invention is the injection of a no-touch representative signal into the input of a signal processing circuit for planar coordinate determining apparatus of the described type in the absence of electrical contact between the overlapping conductive sheets. Preferably, the no-touch signal is in the form of an alternating current voltage. First and second output terminals are provided for the respective coordinate representative signals. A first normally open switch couples one coordinate representative signal from the signal processing circuit to the first output terminal. A second normally open switch couples the other coordinate representative signal from the signal processing circuit to the second output terminal. The first and second switches are both closed in the absence of the no-touch representative signal in the signal processing circuit, thereby transmitting the coordinate representative signals from the signal processing circuit to the respective output terminals only when the sheets make electrical contact. This feature is particularly advantageous in apparatus switching the roles of conductive sheets on an alternative basis as described in the preceding paragraph because, in the absence of electrical contact between the sheets, the potential of the floating sheet is indefinite.

BRIEF DESCRIPTION OF THE DRAWINGS

The features of a specific embodiment of the best mode contemplated of carrying out the invention are illustrated in the drawings in which:

FIGS. 2A and 2B are a detailed schematic diagram of the electrical circuitry of FIG. 1.

DETAILED DESCRIPTION OF THE SPECIFIC EMBODIMENT

Figure 1:
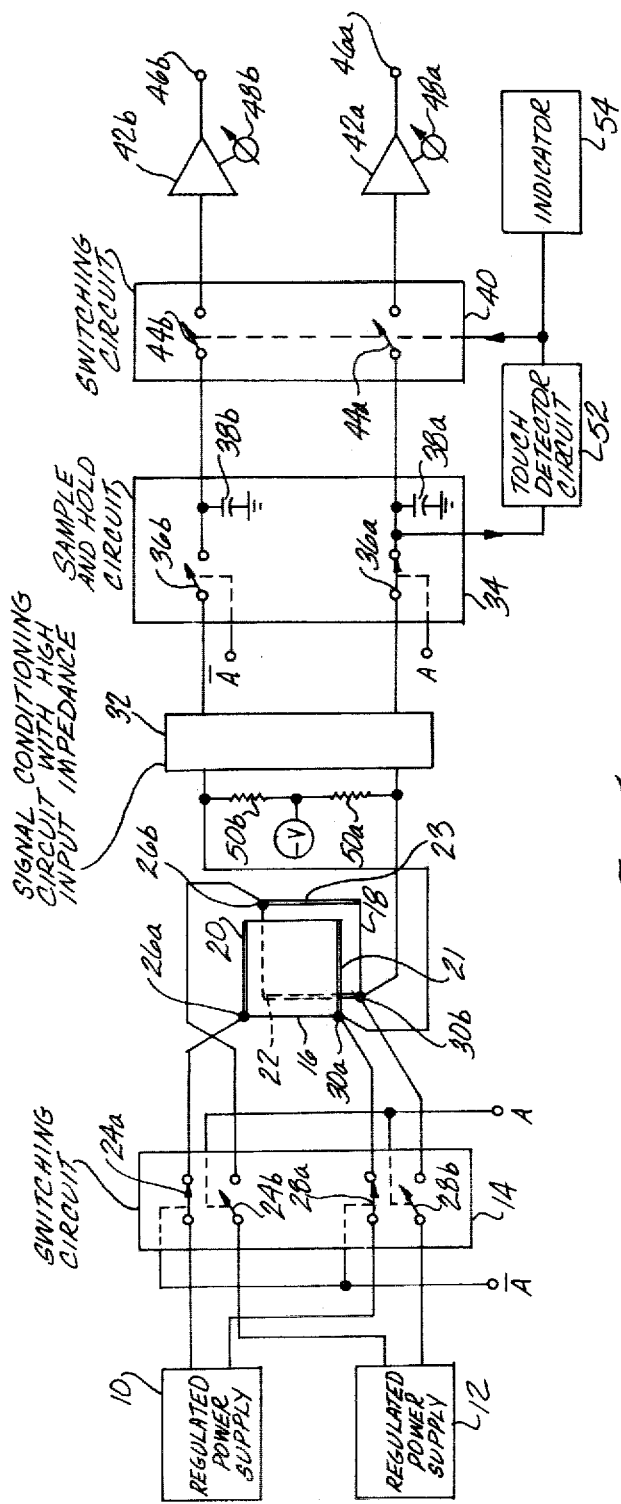
FIG. 1 is a schematic diagram of apparatus for determining planar coordinates in accordance with the principles of the invention.

In FIG. 1, regulated DC power supplies 10 and 12 are coupled by a switching circuit 14 to a pair of normally insulated overlapping conductive sheets 16 and 18 permitting intermittent electrical contact therebetween at selected points of the overlapping area. In one embodiment, sheets 16 and 18 comprise flexible square or horizontal sheets of transparent plastic on which thin transparent layers of electrically conductive material such as gold are deposited. Sheets 16 and 18 are sufficiently flexible to permit electrical contact therebetween when touched. Isolation between sheets 16 and 18 is accomplished by spacing the sheets apart with a thin perforated separator mask or spacing the sheets apart with a thin separator rim around the border of the overlapping area, or by providing electrical separation without physical separation through the application of a pressure sensitive coating to the sheets, such as Sierracin/- Sylmar coating number FX43, which allows inter-sheet contact when firm pressure is applied but no contact when only slight pressure is applied. As used herein, the term "separated sheets" means sheets that are electrically separated, whether or not physically separated. Assuming that sheets 16 and 18 are vertically oriented, bus bars 20 and 21 are horizontally disposed along the top and bottom edges, respectively, of sheet 16 and bus bars 22 and 23 are vertically disposed along the respective side edges of sheet 18. The conductivity of bus bars 20 through 23 is much greater than that of sheets 16 and 18, with the result that sheets 16 and 18 have uniform current density parallel to such bus bars when a voltage drop is impressed thereacross. One output terminal of power supply 10 is connected by a switch 24a via a terminal 26a to bus bar 20 and the other output terminal thereof is connected by a switch 28a via a terminal 30a to bus bar 21. One output terminal of power supply 12 is connected by a switch 24b via a terminal 26b to bus bar 23 and the other output terminal thereof is connected by a switch 28b via a terminal 30b to bus bar 22. First and second indications are alternatively applied to switch control terminals $\overline{A}$ and A, respectively, in the manner described below in connection with FIG. 2.

Still referring to FIG. 1, when terminal $\overline{A}$ is energized by the first indication, switches 24a and 28a close to impress across sheet 16 a potential gradient in a vertical direction, while maintaining equipotential lines in the horizontal direction and floating the potential of sheet 18 by virtue of the fact that switches 24b and 28b are open. When sheets 16 and 18 electrically contact each other during energization of terminal $\overline{A}$, sheet 18 assumes the potential of the point of contact, thereby generating between terminals 30a and 30b a voltage representative of the vertical i.e., Y coordinate of the point of contact between sheets 16 and 18.

When terminal A is energized by the second indication, switches 24b and 28b close to impress across sheet 18 a potential gradient in a horizontal direction, while maintaining equipotential lines in the vertical direction and floating the potential of sheet 16 by virtue of the fact that switches 24a and 28a are open. When sheets 16 and 18 electrically contact each other during energization of terminal A, sheet 16 assumes the potential of the point of contact, thereby generating between terminals 30a and 30b a voltage representative of the horizontal, i.e., X coordinate of the point of contact between sheets 16 and 18.

A signal conditioning circuit 32 with high input impedance relative to sheets 16 and 18, i.e., in the order of a million ohms or more, has a pair of differential inputs to which terminals 30a and 30b, respectively, are connected. Signal conditioning circuit 32 has single ended outputs coupled to a sample and hold circuit 34. In sample and hold circuit 34, one output from signal conditioning circuit 32 is connected by a switch 36a to a signal sampling capacitor 38a. Switch 36a closes when terminal A is energized by the first indication, thereby storing across capacitor 38a a voltage proportional to the Y coordinate representative voltage of the point of contact. Switch 36b closes when terminal A is energized by the second indication, thereby storing across capacitor 38b a voltage proportional to the X coordinate representative voltage of the point of contact. Sample and hold circuit 34 is coupled by a switching circuit 40 to amplifiers 42a and 42b. In switching circuit 40, switches 44a and 44b couple the voltages stored across capacitors 38a and 38b, respectively, to the inputs of amplifiers 42a and 42b, respectively. Amplifiers 42a and 42b have output terminals 46a and 46b, respectively, and biasing adjustments 48a and 48b, respectively, for setting the output voltages of amplifiers 42a and 42b, respectively, when switches 44a and 44b are open.

Because the potential of one of sheets 16 and 18 is always floating, the voltage difference between terminals 30a and 30b is undefined, when sheets 16 and 18 are not touching each other, in part, depending upon the intersheet capacitance and the internal capacitance of the electronics. For this reason, a no-touch signal is injected into signal conditioning circuit 32 by applying a negative DC potential of large amplitude relative to power supplies 10 and 12 to the input of signal conditioning circuit 32 through a high resistance. Specifically, a terminal $-V$ at which a large negative DC potential appears is connected to the respective inputs of signal conditioning circuit 32 through resistors 50a and 50b having high resistance. A touch detector circuit 52 senses the presence or absence of a no-touch signal at capacitor 38a and closes switches 44a and 44b, when a no-touch signal is not sensed. Touch detector circuit 52 also actuates a visual indicator 54 or other devices to signal when sheets 16 and 18 contact each other.

Figure 2A:
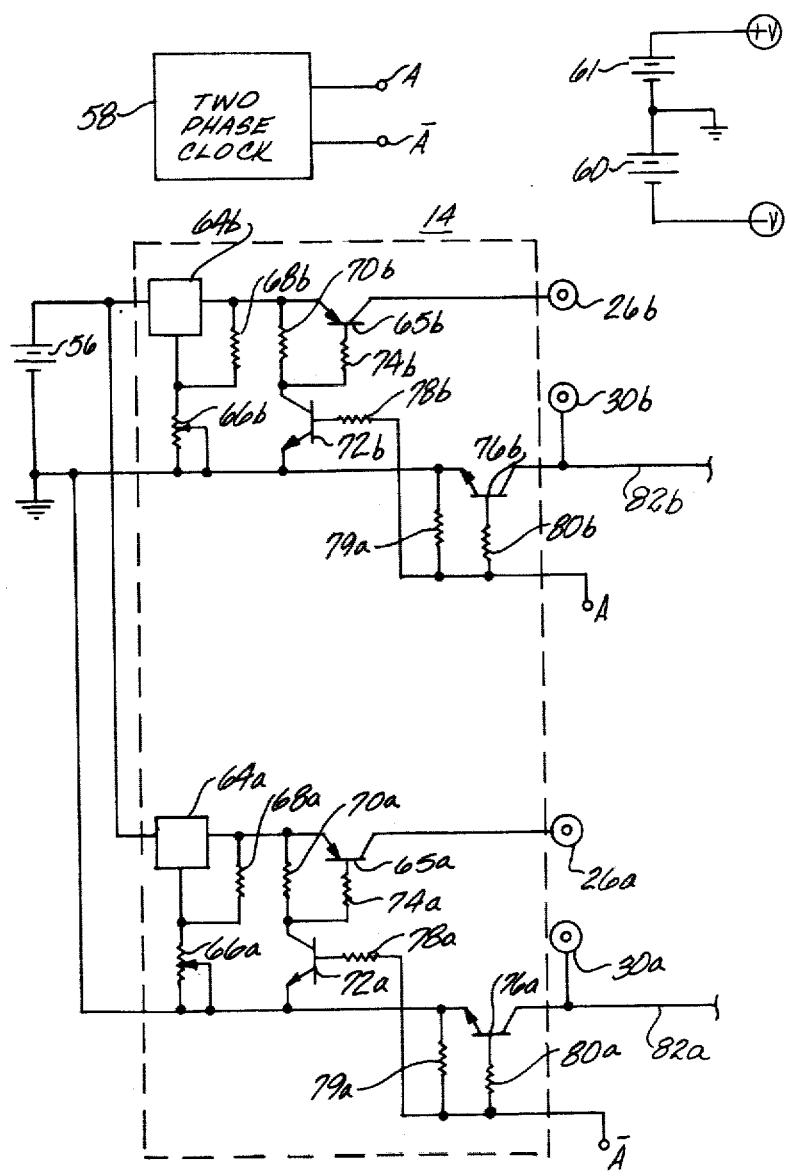

In operation, resistors 50a and 50b each form a voltage divider with sheets 16 and 18, across which the potential at terminal $-V$ appears. When sheets 16 and 18 do not contact each other, the impedance of sheets 16 and 18 to ground is large relative to that of resistors 50a and 50b. As a result, each input to signal conditioning circuit 32 switches between a high potential nearly equal to the amplitude at terminal $-V$ and a low potential, e.g., ground, as terminals A and $\overline{A}$ are alternatively energized. When sheets 16 and 18 contact each other, their impedance to ground is very low relative to that of resistors 50a and 50b. As a result, the potential at terminal $-V$ has virtually no effect on the inputs to signal conditioning circuit 32, irrespective of whether terminal A or terminal $\overline{A}$ is energized, and the voltage across terminals 30a and 30b is coupled to the inputs of signal conditioning circuit 32 without influence by the potential at terminal $-V$. Touch detector circuit 52 discriminates between a no-touch signal and the coordinate representative signals applied to the inputs of signal conditioning circuit 32 and closes switches 44a and 44b to provide Y and X coordinate representative signals of the point of contact at output terminals 46a and 46b, respectively, FIG. 2 shows a detailed schematic diagram of the apparatus of FIG. 1 with a single regulated DC power supply represented by a battery 56 substituted for power supplies 10 and 12 in FIG. 1. The negative terminal of battery 56 is connected to a common ground. The first and second indications are generated by a two-phase clock 58, which could be for example, an astable multivibrator having a 50% duty cycle at a frequency sufficiently high to provide the desired response speed for generating the coordinate representative signals. The circuit time constant associated with capacitors 38a and 38b is large enough to provide a steady voltage at the clock frequency. A typical clock frequency is, for example, 400 Hz. Clock 58 is internally connected to the common ground and has two ungrounded outputs connected respectively to terminals A and Ā. Terminals A and Ā switch at the clock frequency between a positive, energizing potential and ground in phase opposition, i.e., when A is positive, Ā is ground, and vice versa. The positive terminal of a battery 60 and the negative terminal of a battery 61 are connected to the common ground. The negative terminal of battery 60 is connected to terminal −V, also shown in FIG. 1, and the positive terminal of battery 61 is connected to a terminal +V. The circuitry for the Y coordinate, which is identified by reference numerals having the subscript "a", is identical to the circuitry for the X coordinate, which is identified by reference numerals having the subscript "b", and for that reason only the circuitry for the Y coordinate is described. A voltage regulator 64a has an input lead connected to the positive terminal of battery 56, an output lead connected to the emitter of a pnp transistor 65a, and an adjustment lead connected by the end terminals of a potentiometer 66a to the common ground. The slider arm of potentiometer 66a is connected to the common ground to control the voltage at the adjustment lead of voltage regulator 64a. A resistor 68a is connected between the output and adjustment leads of regulator 64a. Voltage regulator 64a is a commercially available item that produces between its output lead and ground a regulated voltage dependent in amplitude upon the voltage between its adjustment lead and ground. A resistor 70a is connected between the emitter of transistor 65a and the collector of a transistor 72a. A resistor 74a is connected between the base of transistor 65a and the collector of transistor 72a. The collector of transistor 65a is connected to a terminal 26a and the collector of a transistor 76a is connected to terminal 30a. The emitters of transistors 72a and 76a are connected together and to the common ground. Resistors 78a, 79a, and 80a, respectively, are connected from terminal Ā to the base of transistor 72a, the emitter of transistor 76a, and the base of transistor 76a. When terminal Ā is grounded, transistors 65a, 72a, and 76a are cut off and the potential of sheet 16 is floating, in the absence of contact with sheet 18. When terminal Ā is positive in potential, transistors 65a, 72a, and 76a conduct to impress across sheet 16 a regulated DC voltage.

Terminal −V is connected by a resistor 50a to the positive input of an operational amplifier 84a. Terminal 30a is directly coupled by a lead 82a to the positive input of operational amplifier 84a, which has direct connection from its output to its negative input. Operational amplifier 84 serves as a buffer, i.e., it has a very high input impedance and a low output impedance. A capacitor 86 is connected across the positive inputs of amplifiers 84a and 84b to control the amplitude of the no-touch signal by increasing the inter-sheet circuit capacitance. The output of amplifier 84b is connected by a resistor 88a to the positive input of an operational amplifier 90a, the output of amplifier 84a is connected by a resistor 91a to the negative input of amplifier 90a, and the output of amplifier 90a is connected by a resistor 92a to the negative input thereof. The positive input of amplifier 90a is connected by a resistor 93a to the common ground. Amplifier 90a converts the differential inputs to amplifiers 84a and 84b to a single ended output, i.e., a positive potential referenced to ground.

The output of amplifier 90a is connected by a resistor 94a to the positive input of an operational amplifier 96a. A resistor 97a is connected from the positive input of amplifier 96a to the common ground. The end terminals of a potentiometer 98a and a resistor 99a are connected in series between the output and the negative input of amplifier 96a. A resistor 100a is connected from the negative input of amplifier 96a to ground. The slider arm of potentiometer 98a is directly connected to the output of amplifier 96a to vary the feedback impedance. The end terminals of a potentiometer 101a are connected between terminals +V and −V. The slider arm of potentiometer 101a is connected by a resistor 102a to the negative input of amplifier 96a. The slider arm position of potentiometer 98a controls the range of the Y coordinate representative signal at output terminal 46a. The slider arm position of potentiometer 101a controls the zero point of the Y coordinate representative signal at output terminal 46a.

The output of amplifier 96a is connected by switch 36a and a resistor 104a to sample and hold capacitor 38a. When terminal Ā is positive in potential, terminal A is at ground potential closing CMOS switch 36a to charge capacitor 38a in proportion to the potential of sheet 16 and when A goes positive switch 36a opens to terminate charging of capacitor 38a.

The junction of resistor 104a and capacitor 38a is connected by switch 44a to the positive input of an operational amplifier 106a. A resistor 107a, the end terminals of a potentiometer 108a, and a resistor 109a are connected in series between terminals −V and +V. The slider arm of potentiometer 108a is connected by a resistor 110a to the positive input of amplifier 106a. The output of amplifier 106a is connected to output terminal 46a and to the negative input of amplifier 106a. Amplifier 106a serves as a buffer, i.e., it has a very high input impedance and a low output impedance. The slider arm position of potentiometer 108a determines the value of the nesting voltage between output terminal 46a and ground, i.e., the voltage when sheets 16 and 18 are not touching.

Touch detector circuit 52 comprises series diodes 112 and 113, a capacitor 114 and a resistor 115 all connected in parallel between the common ground and the positive input of an operational amplifier 116. A capacitor 118 is coupled between the junction of resistor 104a and capacitor 38a and the junction of diodes 112 and 113. A zener diode 120 and a resistor 121 are connected in parallel between the output and the negative input of amplifier 116. The negative input of amplifier 116 is connected by a resistor 122 to the common ground. The output of amplifier 116 is connected to the control inputs of switches 44a and 44b. It has been discovered that when sheets 16 and 18 are not touching, the potential at terminal −V produces across capacitor 38a because of the switching action of switching circuit 14 an alternating current voltage, which is not present across capacitor 38a when sheets 16 and 18 touch each other. This alternating current voltage is employed in the disclosed embodiment of the invention as the no-touch signal. Capacitor 118 serves to transmit the alternating current to the positive input of amplifier 116, while blocking the Y coordinate representative voltage that appears across capacitor 38a when sheets 16 and 18 touch each other. (The latter is essentially DC.) Diodes 112 and 113 rectify the alternating current and capacitor 114 charges to a positive voltage. Resistor 121 determines the gain of amplifier 116 and zener diode 120, when it breaks down, restricts the voltage at the output of amplifier 116 to a value sufficient to hold switches 44a and 44b open. When sheets 16 and 18 touch each other, the alternating current component across capacitor 38a disappears, capacitor 114 discharges, and the voltage at the output of amplifier 116 drops to ground, thereby closing switches 44a and 44b.

A resistor could be substituted for diode 112 or diode 113 in touch detector 52. This has been found to be advantageous in some applications.

Alternatively, touch detector circuit 52 could be coupled to other points in the signal path between circuit 32 and amplifiers 42a and 42b. For example, it could be connected to the output of amplifier 84a. The potential at the output of amplifier 84a switches between a positive value and ground when sheets 16 and 18 touch each other, but switches between a positive value and a slightly negative value when sheets 16 and 18 do not touch each other. Either the positive to negative zero crossing or the negative half cycles could be sensed by a suitably modified touch detector circuit to control switches 44a and 44b in this case.

In a typical embodiment, the components of the circuitry described in connection with FIG. 2 have the following component values or are the following component types:

| | |
|---|---|
| Resistor 50 | 1,800,000 ohms |
| Potentiometer 66 | 200 ohms |
| Resistor 68 | 170 ohms |
| Resistor 70 | 5,100 ohms |
| Resistor 74 | 82 ohms |
| Resistor 78 | 8,200 ohms |
| Resistor 79 | 5,100 ohms |
| Resistor 80 | 1,100 ohms |
| Resistors 88, 91, 92, and 93 | 110,000 ohms |
| Resistors 94 and 100 | 13,000 ohms |
| Resistor 97 | 13,000 ohms |
| Potentiometer 98 | 20,000 ohms |
| Resistor 99 | 6,200 ohms |
| Potentiometer 101 | 100,000 ohms |
| Resistor 102 | 910,000 ohms |
| Resistor 104 | 1,200 ohms |
| Resistors 110, 115, and 121 | 1,000,000 ohms |
| Resistors 107 and 109 | 111,000 ohms |
| Resistor 122 | 20,000 ohms |
| Potentiometer 108 | 2,000 ohms |
| Capacitor 38 | 0.1 microfarads |
| Capacitor 86 | 1.5 nanofarads |
| Capacitors 114 and 118 | 0.01 microfarads |
| −V | −15 volts |
| +V | +15 volts |
| Power supply 56 | +5 volts |
| Regulator 64 | LM 317 |
| Transistor 65 | 2N2907A |
| Transistors 72 and 76 | 2N2222A |
| Amplifiers 84 and 106 | National LM324N |
| Amplifiers 90 and 96 | Fairchild µA747E |
| Amplifiers 116 | Fairchild µA741E |
| Switches 36 and 44 | Siliconix DG201BP |
| Diodes 112 and 113 | 1N914 |
| Zener diode 120 | 1N4733 |

The described embodiment of the invention is only considered to be preferred and illustrative of the inventive concept; the scope of the invention is not to be restricted to such embodiment. Various and numerous other arrangements may be devised by one skilled in the art without departing from the spirit and scope of this invention. For example, a no-touch representative signal can be generated in accordance with the principles of the invention for other types of apparatus for determining planar coordinates. Or different types of sheets could be employed such as the sheets in U.S. Pat. No. 3,662,105, which are pierced by a metallic needle.

What is claimed is:

1. Apparatus for determining planar coordinates comprising:
   a pair of normally spaced overlapping conductive sheets having sufficient flexibility between them to permit electrical contact when touched;
   first and second spaced approximately parallel electrodes extending across one sheet;
   first and second spaced approximately parallel electrodes extending across the other sheet transversely to the first and second electrodes extending across the one sheet;
   means for generating electrical power;
   means for alternatively connecting the power across the first and second electrodes, respectively, of one sheet to the exclusion of the first and second electrodes of the other sheet;
   a signal processing circuit having a high input impedance and first and second differential input terminals; and
   means for connecting the second electrodes of the sheets to the respective input terminals of the signal processing circuit to alternatively indicate across such input terminals the planar coordinates of a point of electrical contact between the sheets.

2. The apparatus of claim 1, in which the electrodes each comprise a bus bar having substantially higher conductivity than the sheets.

3. The apparatus of claim 1, in which the generating means comprises a first regulated power supply having first and second output terminals and a second regulated power supply having first and second output terminals, and the means for alternatively connecting the power across the first and second electrodes comprises switching means alternatively connecting the first and second output terminals of the first power supply to the first and second electrodes, respectively, of one sheet and connecting the first and second output terminals of the second power supply to the first and second electrodes, respectively, of the other sheet.

4. The apparatus of claim 1, in which the generating means comprises a single regulated power supply having first and second output terminals and the means for alternatively connecting the power across the first and second electrodes comprises switching means for alternatively connecting the first and second output terminals to the first and second electrodes, respectively, of one sheet and the first and second electrodes, respectively, of the other sheet.

5. The apparatus of claim 1, in which the generating means comprises means for generating direct current electrical power.

6. The apparatus of claim 1, additionally comprising a two-phase clock having a first phase and a second phase, the means for alternatively connecting the power across the first and second terminals comprising means responsive to the clock for alternately connecting the power across the first and second electrodes, respectively, of one sheet during one phase of the clock, and across the first and second electrodes, respectively, of the other sheet during the second phase of the clock.

7. The apparatus of claim 6, in which the signal processing circuit includes means responsive to the clock for storing a first coordinate representative signal indicative of the difference in potential between the first and second input terminals during the first phase and for storing a second coordinate representative signal indicative of the difference in potential between the second and first input terminals during the second phase.

8. The apparatus of claim 7, in which the storing means comprises:
  a preamplifier having a high input impedance and a differential input, serving as the input terminals to the signal processing circuit and a differential output, first and second difference amplifiers each having first and second inputs connected to the output of the preamplifier to convert same to single ended outputs;
  a first sample and hold circuit;
  a first normally open switch connected between the first difference ampliifier and the first sample and hold circuit, the first switch closing responsive to the clock during the second phase;
  a second sample and hold circuit; and
  a second normally open switch connected between the second difference amplifier and the second sample and hold circuit, the second switch closing responsive to the clock during the first phase.

9. The apparatus of claim 8, in which the signal processing circuit additionally comprises:
  a first output amplifier;
  a third normally open switch coupling the first sample and hold circuit to the first output amplifier;
  a second output amplifier;
  a fourth normally open switch connecting the second sample and hold circuit to the fourth amplifier;
  means in the absence of electrical contact between the sheets for injecting into the input terminals of the signal processing circuit a no-touch representative signal; and
  means responsive to the absence of the no-touch representative signal in the signal processing circuit for closing the third and fourth switches, thereby transmitting the coordinate representative signals from the sample and hold circuits to the respective output amplifiers.

10. The apparatus of claim 9, in which the injecting means comprises:
  a source of direct current bias voltage having a substantially larger voltage amplitude than the power from the generating means, the bias voltage source having a first output terminal connected to one output terminal of the power supply and a second output terminal;
  a first resistor substantially larger than the resistance of the sheets connected between the second output terminal of the bias voltage source and the second input terminal of the signal processing cicuit; and
  a second resistor substantially larger than the resistance of the sheets connected between the second output terminal of the bias voltage source and the second input terminal of the signal processing circuit, whereby a large bias voltage is alternately applied to the first and second input terminals during the phases of the clock.

11. The apparatus of claim 10, in which the means for closing the third and fourth switches comprises:
  a rectifier connected in the signal processing circuit to detect the bias voltage at one of the input terminals;
  a capacitor connected to the rectifier to store the detected bias voltage as rectified; and
  means responsive to a voltage across the capacitor representative of the bias voltage, but unresponsive to a voltage across the capacitor representative of coordinates of a point of contact between the sheets, for closing the third and fourth switches.

12. Apparatus for determining planar coordinates comprising:
  a pair of normally spaced overlapping conductive sheets having sufficient flexibility between them to permit electrical contact when touched;
  first and second spaced approximately parallel electrodes extending across one sheet;
  first and second spaced approximately parallel electrodes extending across the other sheet transverse to the first and second electrodes extending across the one sheet;
  means for applying electrical power to the first and second electrodes of each sheet to generate a first signal and a second signal representative of the planar coordinates of a point of electrical contact between the sheets;
  signal processing means having an input;
  means for applying the coordinate representative signals to the input of the signal processing means;
  first output terminal means for the first coordinate representative signal;
  second output terminal means for the second coordinate representative signal;
  a first normally open switch coupling the first coordinate representative signal from the signal processing means to the first output terminal means;
  a second normally open switch coupling the second coordinate representative signal from the signal processing means to the second output terminal means;
  means in the absence of electrical contact between the sheets for injecting into the input of the signal processing means a no-touch representative signal; and
  means responsive to the absence of the no-touch representative signal in the signal processing means for closing the first and second switches, thereby transmitting the coordinate representative signals from the signal processing means to the respective output terminal means.

* * * * *